(12) United States Patent
Greene

(10) Patent No.: US 6,330,401 B1
(45) Date of Patent: Dec. 11, 2001

(54) CAMERA AND BINOCULAR PREAMPLIFIER COMBINATION

(76) Inventor: Charles F. Greene, 249 Shore Rd., Greenwich, CT (US) 06830

( * ) Notice: Subject to any disclaimer, the term of this patent is extended or adjusted under 35 U.S.C. 154(b) by 43 days.

(21) Appl. No.: 09/588,176

(22) Filed: Jun. 7, 2000

(51) Int. Cl.[7] .......................... G02B 23/00; G02B 27/02
(52) U.S. Cl. ........................................ 396/432; 359/480
(58) Field of Search .................. 396/6, 429, 432; 359/362, 399, 407, 419, 480; 342/253

(56) References Cited

U.S. PATENT DOCUMENTS 2,765,718   10/1956   Beecher ............................. 396/432
5,634,164    5/1997   Isozaki ............................. 396/535

OTHER PUBLICATIONS

Wolfgang, S 10 Tele–Fotos Dec. 30, 1999, www.dpreview.com, Forum: Cannon Talk.*

* cited by examiner

Primary Examiner—David M. Gray
Assistant Examiner—Rochelle Blackman
(74) Attorney, Agent, or Firm—Dougherty & Troxell

(57) ABSTRACT

A camera and binocular preamplifier combination and method for photographing distant objects with a relatively inexpensive camera are disclosed. The combination includes a relatively inexpensive camera such as a disposable camera and a relatively small pair of binoculars. One optical system in the binoculars is positioned against the lens of a camera and in general alignment with the camera lens and a photograph taken.

1 Claim, 6 Drawing Sheets

CAMERA AND BINOCULAR PREAMPLIFIER COMBINATION

FIELD OF THE INVENTION

This invention relates to a camera and binocular preamplifier combination and to a method for photographing distant objects with a relatively inexpensive camera. The invention relates more particularly to the use of a camera with a relatively simple lens and a binocular telescope of limited power to take relatively sharp photographs that are relatively free of blurring due to shaking while taking a photograph.

BACKGROUND FOR THE INVENTION

In photographing distant objects such as monuments, scenery, wild animals, athletes and the like, it is customary to employ a telescopic lens such as those employed with sophisticated cameras. Such cameras and telescopic lenses are not only expensive but are also cumbersome and frequently require the use of a tripod of other support to eliminate a problem associated with an individual's inability to hold the camera steady while taking a photograph. When a photographer having a telescopic lens for his or her camera sets out to take certain types of subjects, such as wild animals, it is customary to first employ relatively high powered binoculars to locate the animal and then to photograph the animal through the use of the telescopic lens. For such occasions, it is necessary to have three pieces of relatively expensive equipment, namely an expensive camera, a telescopic lens and an expensive pair of binoculars. It may also be necessary to have a tripod which adds to the bulk of what needs to be carried.

One approach to overcoming such problems is disclosed in U.S. Pat. No. 2,765,718 which relates to a combination binocular telescope and camera. As disclosed therein, an adapter is used for connecting one eye portion of a binocular telescope with the lens of a camera. The adapter is easily removable when it is desired to employ both eye portions of the binoculars. As disclosed in the patent, the combination binocular telescope and camera permit an individual to view the subject through one portion of the binoculars and photograph the subject through the other portion so that focusing of the binoculars may be constantly carried out when either the subject or the photographer is moving.

With the introduction and growing popularity of disposable cameras, an increased mobility of individuals more and more individuals are unwilling to pay the high prices for sophisticated cameras. They are also unwilling to travel with or even carry bulky equipment from place to place. Nevertheless, many of these same individuals may carry compact binoculars such as opera glasses and/or binoculars having a power of 7 or less for use on a boat, in national parks and on other outings. A number of such individuals may also carry an inexpensive compact camera and will from time to time be dissatisfied with the shortcomings of such cameras.

Accordingly, it is presently believed that there may be a relatively large demand for a camera binocular preamplifier combination in accordance with the present invention. It is believed that there may be a significant demand because such combinations are relatively compact, light in weight and durable. The combinations are also relatively inexpensive and allow an individual to photograph distant objects with an inexpensive camera and to obtain relatively close-up sharp photographs of such objects. At the same time, the present invention does away with any need for a separate adapter and the use of a threaded eyepiece portion of the binoculars to attach a camera to a binocular telescope.

BRIEF SUMMARY OF THE INVENTION

In essence, the present invention contemplates a camera and binocular preamplifier combination. The combination includes a binocular telescope having a housing, two eye portions and two independent optical systems disposed within the housing. Each of the independent optical systems include at least a pair of lenses which are aligned along an optical axis and which are adapted to receive light from an object for transmission to one of the eye portions. The binocular telescope also includes a pair of generally circular eyepieces disposed in the housing adjacent to the eye portions. Each of the eyepieces have a smooth outer surface and are adapted to be pressed comfortably against an individual's face in the area around the individual's eye. In a preferred embodiment of the invention, the binocular telescope has a power or magnification of 7 or less and preferably in excess of 3.

The combination also includes a camera preferably of relatively lightweight having a light-tight body with front and rear portions. A lens and shutter assembly are disposed in the front portion of the light type body. A film support is disposed in the rear portion of the body for positioning a piece of photographic film opposite the lens. Then when the shutter is open, light will pass through the lens to thereby form an image on the film in a conventional manner. In the present invention, the face of the camera is constructed and arranged to have an eyepiece of a binocular pressed against it and held in place with the optical axis of one of the independent optical systems in general alignment with the optical axis of the camera lens and is free of any adapter therebetween. In this way, one of the independent optical systems acts as a preamplifier for the camera.

The invention also contemplates a method for photographing distant objects with an inexpensive camera and binocular preamplifier. The method includes the following steps: The first step is to provide a camera such as a relatively inexpensive or disposable camera having a relatively flat face portion, a rear portion and a lens and shutter assembly disposed in the front portion of the camera. The camera also includes a viewfinder. A photographic film is positioned in the rear portion of the camera so that the lens forms an image of an object on the film when the shutter is in an open position. The method also includes the step of providing a binocular telescope having two independent optical systems each with a power of between 3 to 7 and two eyepieces. Each of the optical systems are focused on a distant object and the object is then viewed through the camera viewfinder. In the next step, one of the binocular eyepieces is pressed against the relatively flat-face portion of the camera and the optical axis of the binocular in general alignment. The object is then viewed through the camera viewfinder and the shutter opened and closed to thereby form an image of the object on the film.

The invention will now be described in connection with the accompanying drawings wherein like reference numerals have been used to indicate like parts.

DESCRIPTION OF THE PREFERRED EMBODIMENTS OF THE INVENTION

Figure 1:
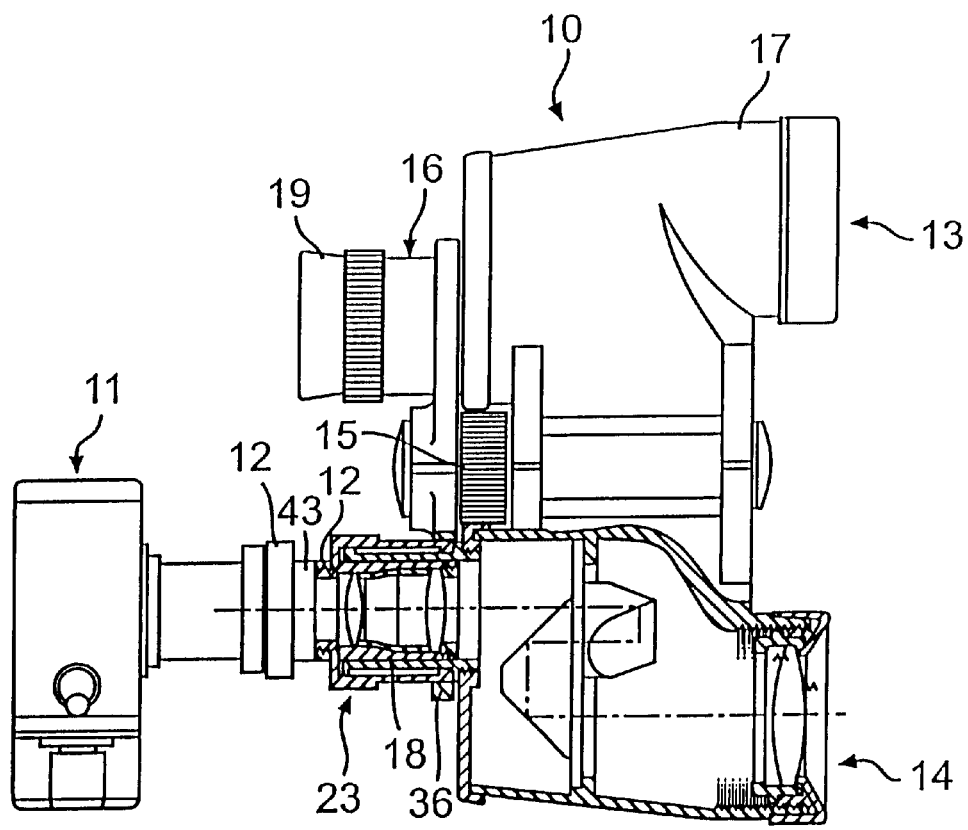
FIG. 1 is a top plan view of a prior art combination camera and binocular telescope.

A prior art combination binocular telescope and camera is shown in FIG. 1. As shown therein, a binocular telescope 10 commonly referred to as binoculars, opera glasses or field glasses are combined with a camera 11. The binocular telescope 10 and camera 11 are removably connected together by an adapter 12. The binocular 10 is illustrated as being of the prism-type and includes a left portion 13 which is adapted to transmit an image to the left eye of a viewer while a right portion 14 corresponds to the portion 13 and normally serves to transmit an image to the right eye of the viewer. The binocular 10 as disclosed in the prior art are of the variety wherein both of the eye pieces are simultaneously focused, as for example by a knurled cylinder 15 mounted between the binoculars portions 13 and 14.

As illustrated in FIG. 1, the prior art device includes an eye lens assembly 16 which is threaded onto the rear wall of a lens housing 17. When used as a viewing device, a threaded male end of each lens mount cylinder 18 is normally provided with an eye ring 19 which is threaded thereon to assume the position shown in connection with the left portion 12.

In the aforementioned prior art device, the eye ring 19 for the right portion 14 of the binocular is removed and an adapter 12 is substituted therefor to provide a mounting for the camera 11.

A disposable camera 22 of a type useful in the practice of the present invention is shown in FIG. 2a. As shown therein, the camera 22 includes a unit body 23 and an outer case 24 which encases the unit body 23. The outer case 24 is typically made of a blanket sheet such as cardboard or the like. The unit body 23 contains a roll of unexposed photographic film (not shown) therein. A lens 26, viewfinder 27, flash window 28, frame counter 31, and indication lamp 32 for indicating the completion of charging and shutter release button 33 are provided in the unit body 23.

The unit body 23 also includes a front surface or wall 23a which is covered by a front portion 24f of the outer case 24. The unit body 3 also includes a grip portion 23b which protrudes forwardly of the front portion 24f and an opposite side 23c. The outer case 24 also includes an open end 24a which allows the unit body 23 to be slipped into the outer case 24. A camera of the type used in connection with the present invention is defined in more detail in U.S. Pat. No. 5,634,164 which is incorporated herein in its entirety by reference.

Figure 2:
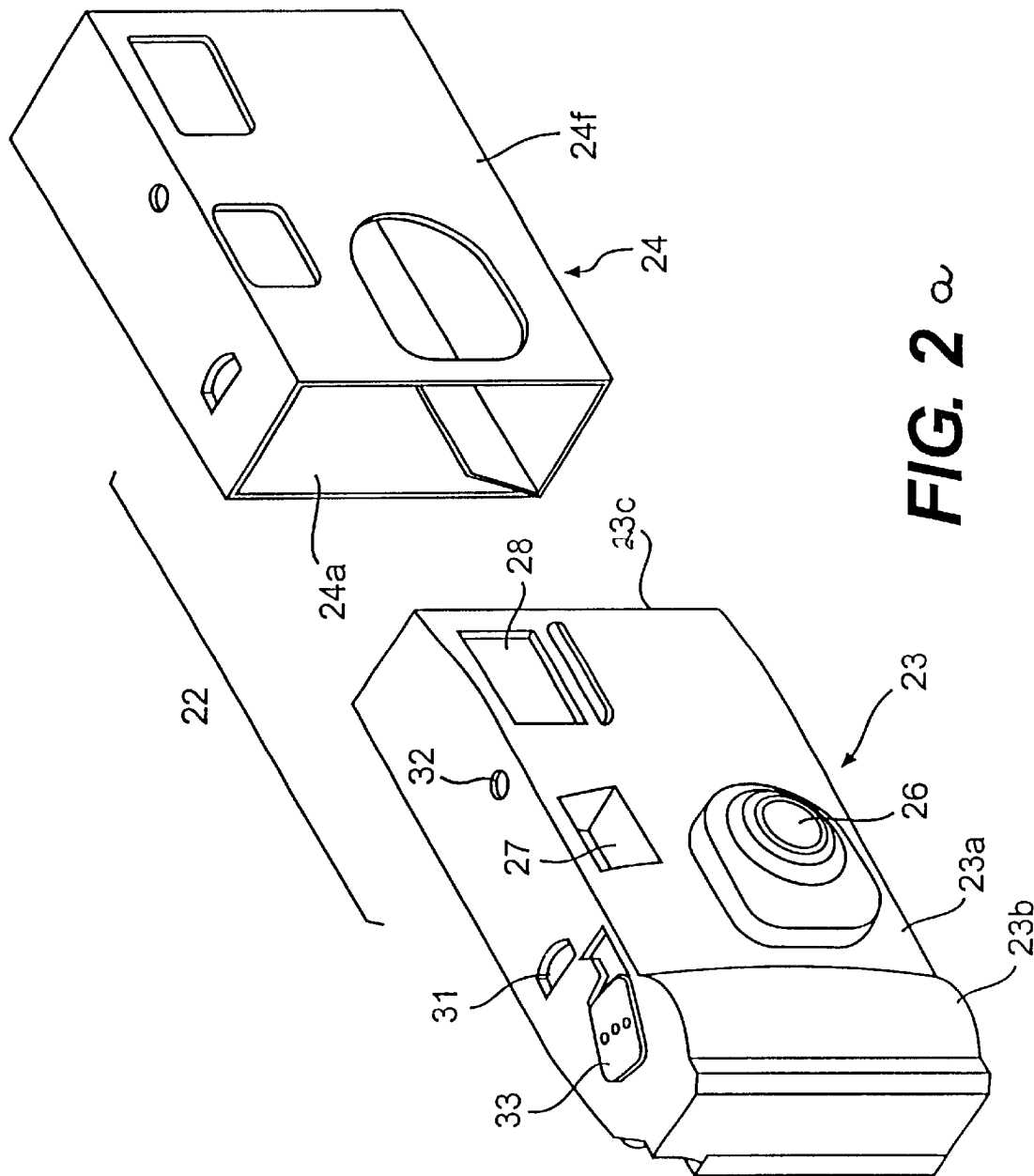
FIG. 2a is a perspective view of a disposable camera of the type used in one embodiment of the present invention.
FIG. 2b is a schematic illustration of a lens shutter and film support as used in a disposable camera.
Figure 2B:
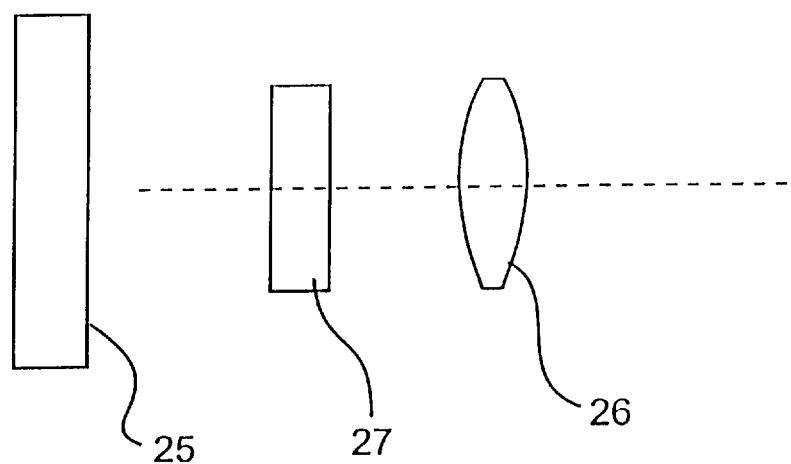

FIG. 2b illustrates a film support 25, lens 26 and shutter assembly 27 for use in a camera of the type used in practicing the present invention.

Figure 3:
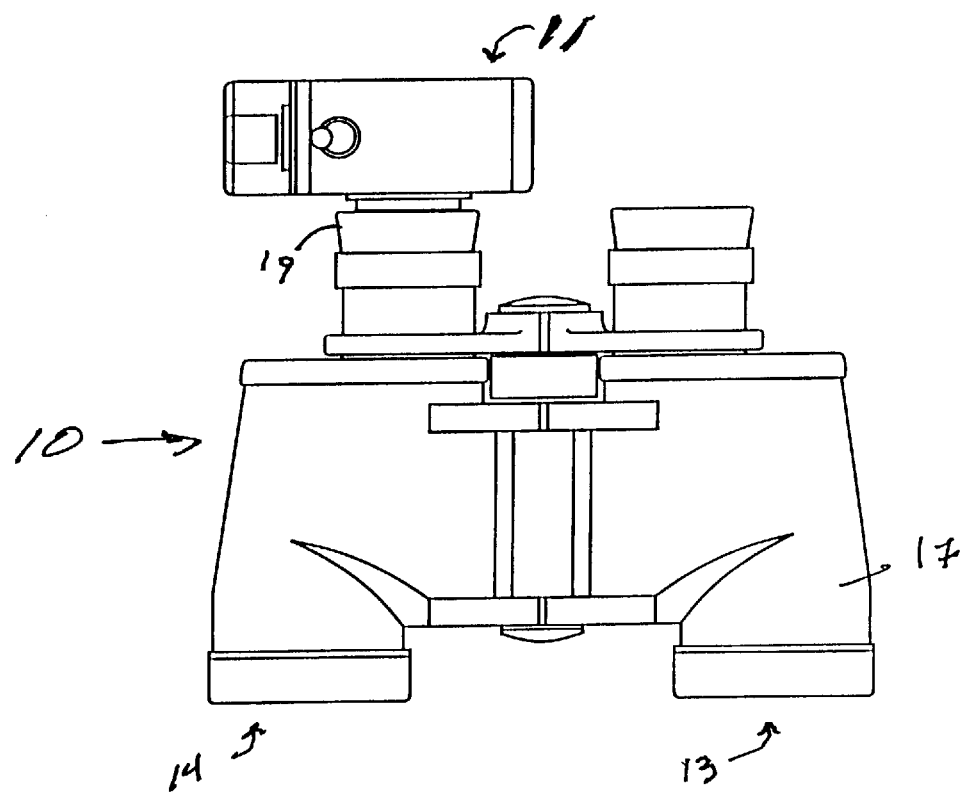
FIG. 3 is a top plan view of a combination camera and binocular preamplifier in accordance with the present invention.

FIG. 3 shows a binocular telescope preamplifier combination in accordance with the present invention. As shown therein, the combination includes a pair of ordinary binoculars or opera glasses which are referred to herein as binocular telescope 17. The binoculars as shown includes left portion 13 and right portion 14 for transmitting light to the eyes of an individual in the same manner as those shown in FIG. 1.

However, as illustrated in FIG. 3, the binocular telescope 10 is removably held with its eye ring 19 firmly pressed against the front face of the camera 11 in a position wherein the eye ring 19 surrounds the lens 26 (shown in FIG. 2a). As shown in FIG. 3, there is no adapter and no direct connection between the camera lens and the eye ring. In other words, the camera and binocular are merely held together by the individual.

In a preferred embodiment of the invention, the binoculars have a power of between 3 and 7 and are of lightweight. For example, a pair of 5×35 to 7×35 are more compact and more easily handled and held steady than a more powerful binocular such as 12×50. The reason is that it is important to hold the camera and binocular combination steady in order to minimize any blurring of the picture due camera and binocular movement when taking a photograph. This is particularly true when using slide film which will after development be subsequently projected in enlarged form on a screen.

It is also contemplated that the present invention will incorporate a relatively lightweight camera such as the presently popular disposable variety as shown in FIG. 2. Such cameras can be easily held and operated with one hand while the binoculars are held by the other hand. In addition, it enables a photographer, even a relatively young child to position the camera and binoculars juxtapositioned and against their face in a very steady manner.

Figure 4A:
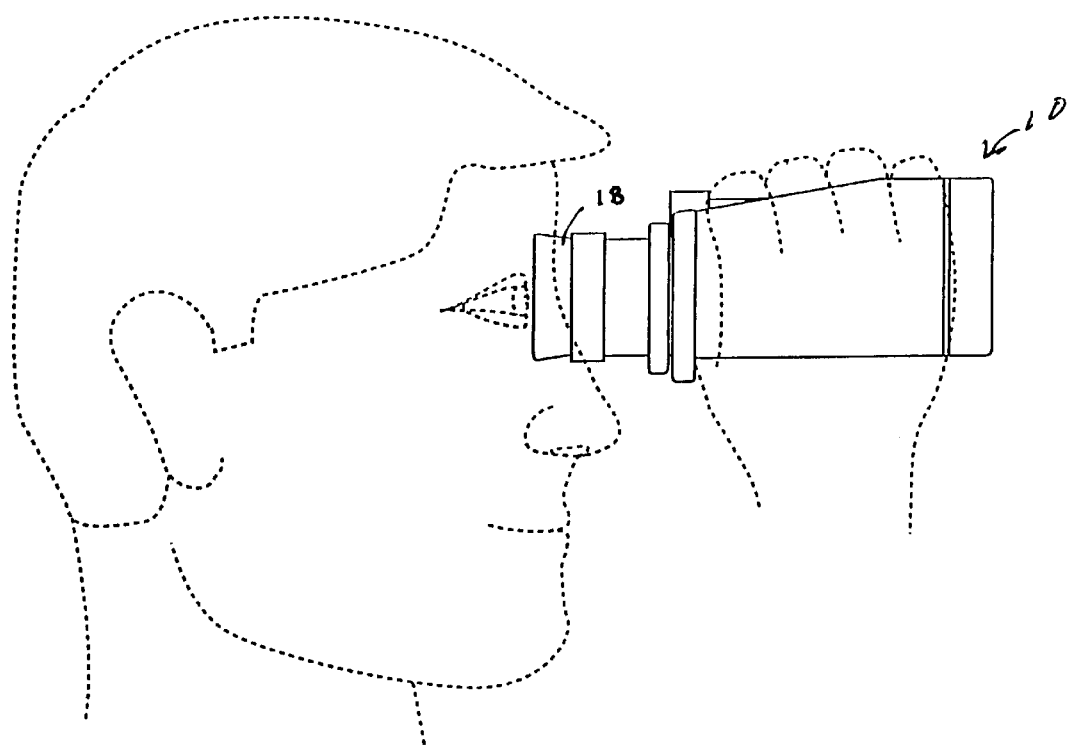
FIG. 4A is a schematic illustration of one of the steps in a method in accordance with the present invention.
Figure 4B:
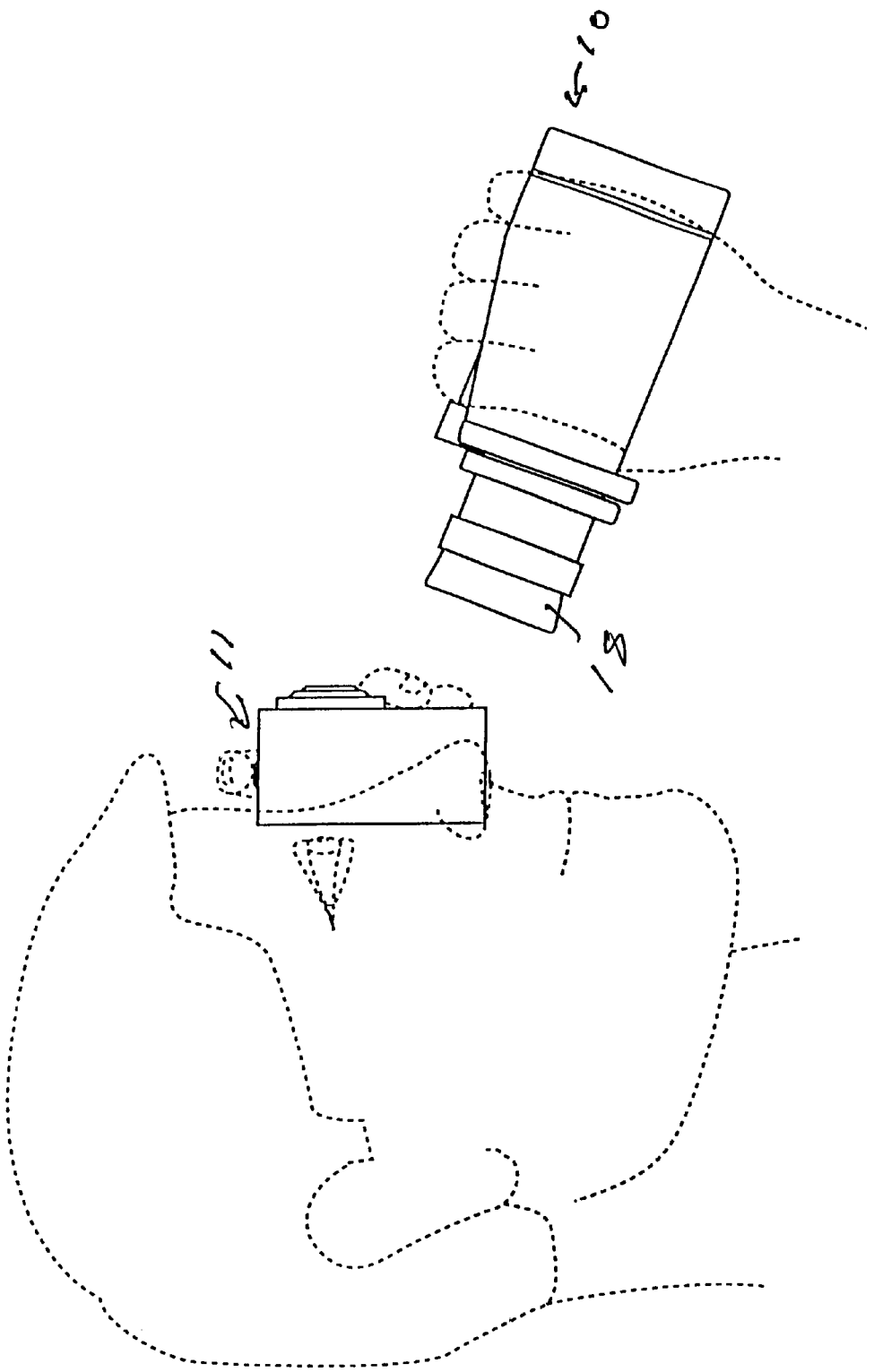
FIG. 4B is a schematic illustration of another step in a method in accordance with the present invention.
Figure 4C:
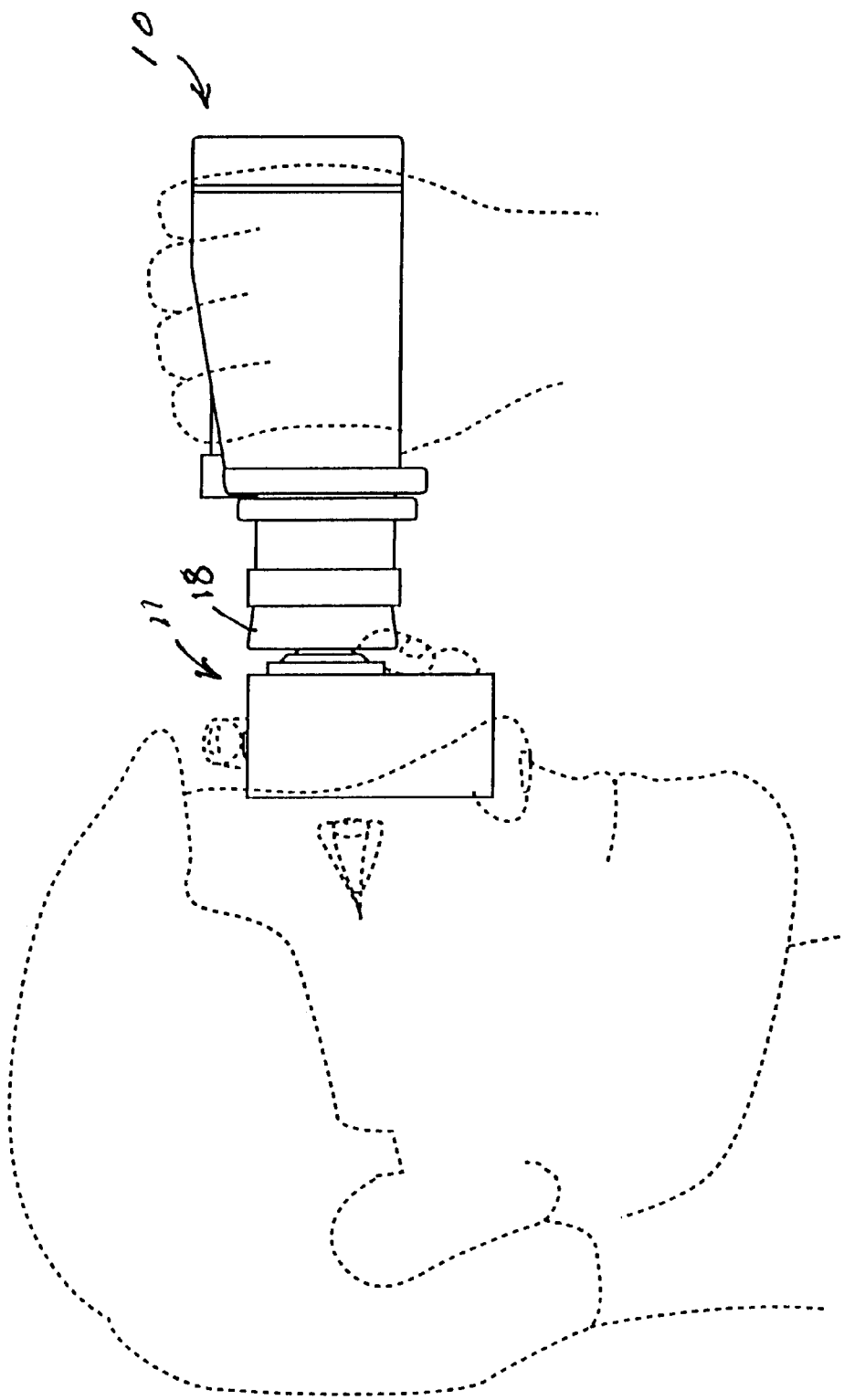
FIG. 4C is a schematic illustration of a further step in a method in accordance with the present invention.

The method in accordance with the present invention is illustrated in FIGS. 4A–4C. As illustrated therein, an individual is viewing a distant scene through a pair of binoculars 10 with the binoculars held in the right hand and perhaps with both hands. The eyepiece 18 is pressed against the individual's face in an area surrounding the individual's eye. The binoculars are then focused in a conventional manner. This focusing step can utilize individual adjustment rings to affect longitudinal focusing movement or by a conventional yoke mechanism which focuses both optical systems simultaneously with a single adjustment.

When an individual views an object through the binoculars, he lowers the binoculars 10 and using the viewfinder in the camera 11 looks at the object and aligns the camera for the photograph in a conventional manner. For example, FIG. 4B illustrates the camera 11 positioned against the individual's face and held there in the left hand. Then without moving the camera, the binocular telescope 10 is brought into engagement with one eyepiece and with the optical axis of the lens and the eyepiece in general alignment. The binoculars are then held tightly against the lens as shown in FIG. 4C and a photograph is taken.

As shown in FIG. 4C, the camera and binoculars may be held in a manner that the individuals other eye, that is the eye which is not looking through the viewfinder is unobstructed by the binoculars.

While the invention has been described in connection with its preferred embodiment, it should be recognized and understood that changes and modifications may be made therein without departing from the scope of the appended claims.

What is claimed is:

1. A method for photographing distant objects with a camera and a binocular pre-amplified, said method comprising the step of:

a) providing a disposable camera having a relatively flat face portion, a view finder, a rear portion and a lens having simple structure and an optical axis disposed in the relatively flat face portion of the camera, a film support and a piece of photographic film disposed in the rear portion of the camera and a shutter assembly having an open and closed position disposed in the camera so that the lens forms an image of an object on the film when the shutter assembly is in an open position;

b) providing a binocular telescope having two optical systems each with an optical axis and with a power of about 3 to 7 and two eye pieces each of which is adapted to fit flush against the relatively flat face of the camera;

c) viewing the distant object through the binocular telescope and focusing the binoculars on the distant object before photographing the object through th binocular telescope;

d) viewing a distant object through the viewfinder of the camera;

e) holding the camera in one hand and the binoculars in the other, positioning the binocular telescope with one of the binocular eye pieces held tightly against the relatively flat face portion with the optical axis of one of the optical systems in general alignment with the optical axis of the lens of the camera so that the binocular telescope does not obstruct the view through the camera viewfinder and without obstructing the view through the other binocular optical system; and, f) opening and closing the shutter while maintaining the camera and the binocular telescope held tightly together.

* * * * *